H. L. DARLING.
SYSTEM OF MOTOR OPERATED TREE VIBRATION FOR SAVING BUDS AND BLOSSOMS FROM FROST.
APPLICATION FILED MAY 15, 1911.
1,027,403.
Patented May 28, 1912.
2 SHEETS—SHEET 1.
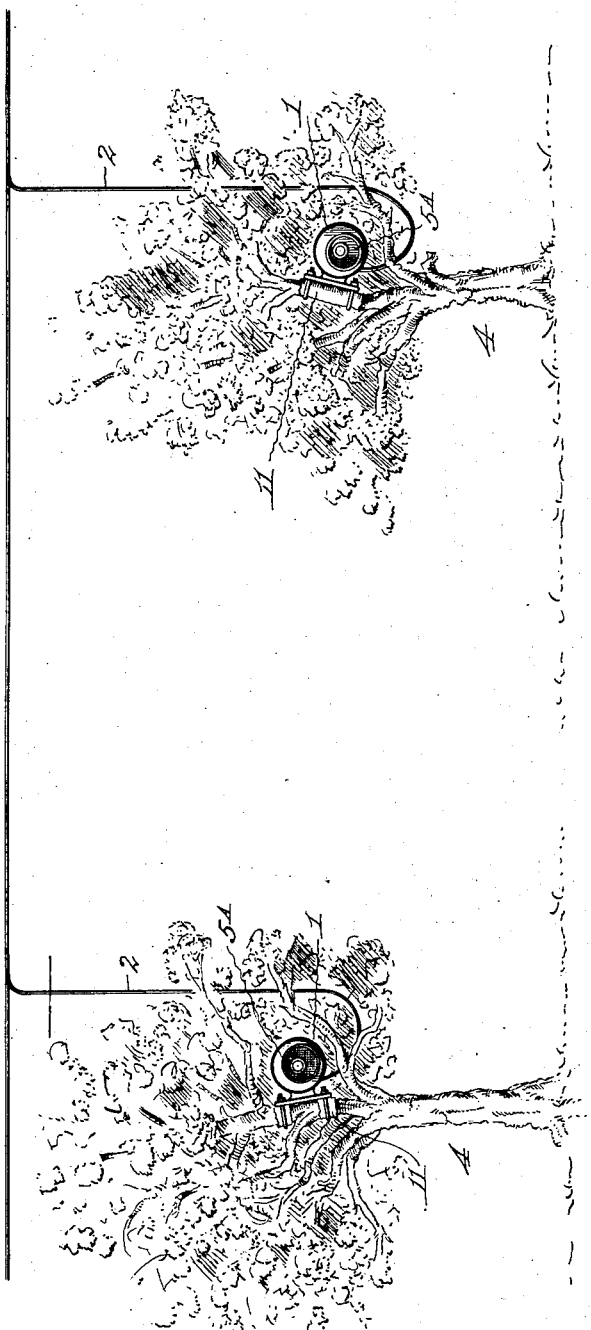
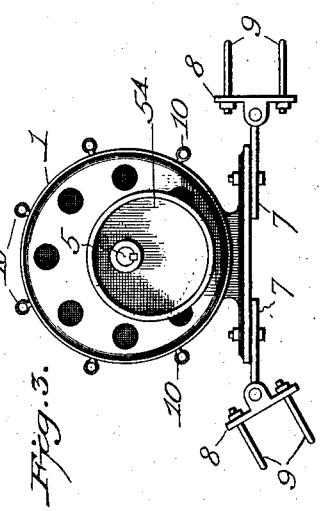

H. L. DARLING.
SYSTEM OF MOTOR OPERATED TREE VIBRATION FOR SAVING BUDS AND BLOSSOMS FROM FROST.
APPLICATION FILED MAY 15, 1911.
1,027,403.
Patented May 28, 1912.
2 SHEETS—SHEET 2.
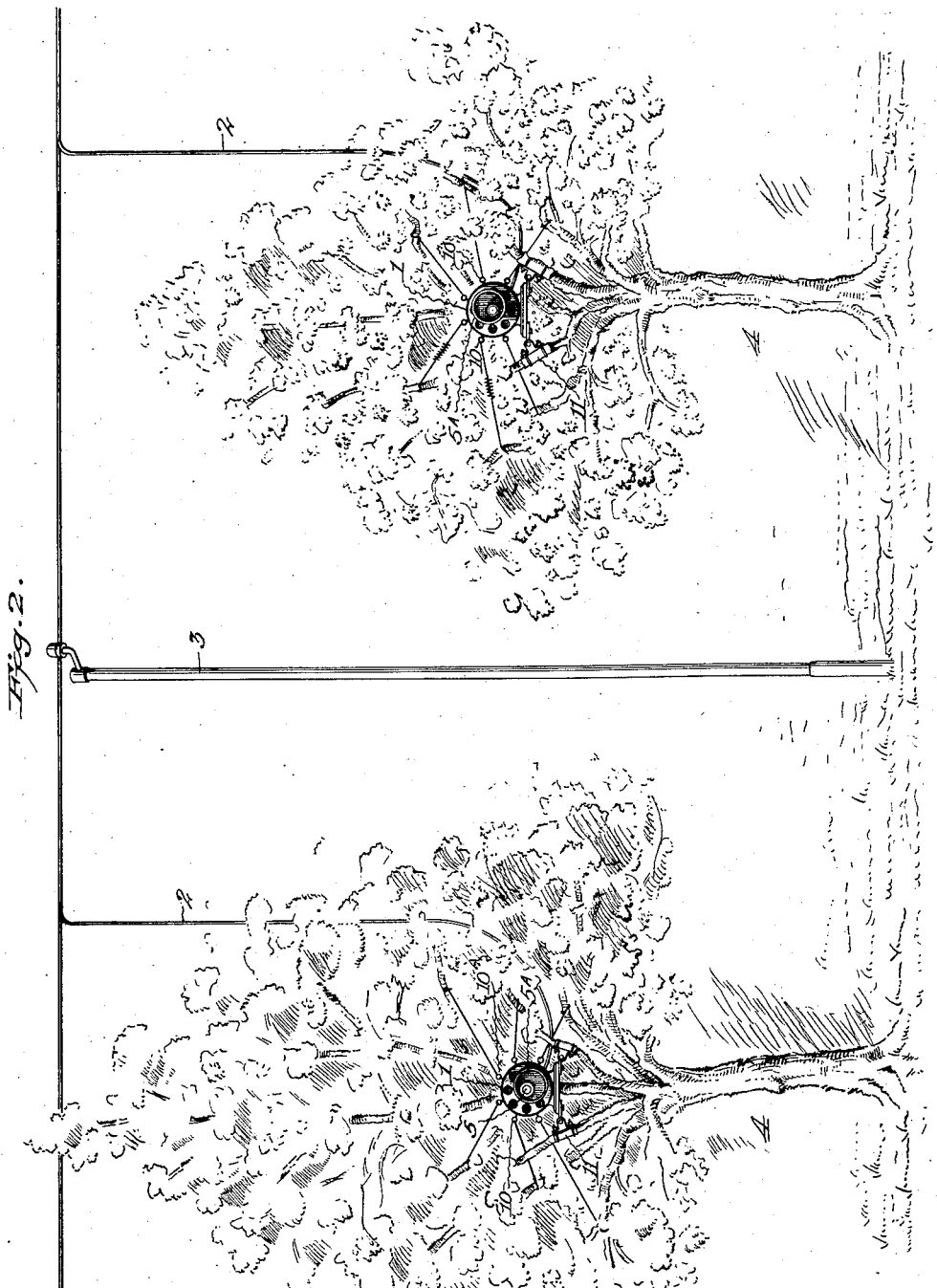

UNITED STATES PATENT OFFICE.

HERMAN L. DARLING, OF DELTA, COLORADO.

SYSTEM OF MOTOR-OPERATED TREE VIBRATION FOR SAVING BUDS AND BLOSSOMS FROM FROST.

1,027,403.  Specification of Letters Patent.  Patented May 28, 1912.

Application filed May 15, 1911. Serial No. 627,322.

*To all whom it may concern:*

Be it known that I, HERMAN L. DARLING, a citizen of the United States of America, residing at Delta, county of Delta, and State of Colorado, have invented a new and useful System of Motor-Operated Tree Vibration for Saving Buds and Blossoms from Frost, of which the following is a specification.

My invention relates to a new system of motor-operated tree vibration for saving buds and blossoms from frost during their fruit blossoming season.

My new system aims to create in fruit trees a movement of the sap to the buds and blossoms that tends to vitalize them enough to resist the attacking blight of frost. This movement of the sap might be called a capillary action, and can be likened to the gentle exercising action of an electric vibrator instrument on the human system, which stimulates the flowing action of blood through the veins of a person, especially at the point where the vibrator is applied.

The essential object of my invention is to apply to fruit trees in a structural system, a motor-operated vibratory action in such a way as to cause the limbs, twigs, buds or blossoms of the tree to vibrate through the medium of a source of power for the motor, and my invention contemplates in this respect the broadest use possible of any and every and all means, either mechanical, electrical, pneumatic, or hydraulic, or a combination of one or more of these means, and a suitable vibratory motion motor.

My new system of generating in trees a vibratory trembling action that will render them immune from the severest frosts and freezes that they can possibly be subjected to during the months of April and May, which is the time they are subjected to danger of destruction by frosts and freezes, can be carried out and applied in an operative manner in a number of ways, and through the medium of numerous arrangements of the above named agencies, embodied in various kinds and characters of apparatus. I have, however, devised a simple and inexpensive system for imparting a vibratory trembling action to the bud and blossom laden twigs, slips, limbs, and branches of fruit trees, that can be installed in orchards in a very short time and at small expense, and that does not harm the trees or interfere with the working of the ground around them or with the pruning, spraying, or other characters of manipulation they require for their best development.

My system comprises the installation in the tree around its branches of a small electric motor having a vibratory trembling rotary movement, and operatively connected by suitable current transmitting wires to an electric current generating and circulating system, which of course may be a small generator owned by the orchardist or may be a town or city electric power plant, or a water power electric power generating plant located many miles from the orchard. This vibratory trembling rotary movement may be attained in the motor by an unbalanced rotating member or by an eccentrically mounted member or by an unbalanced flywheel, and also by other mechanism, examples of which are found in vibrating machines used by doctors and physicians for therapeutic purposes, and also by barbers.

My invention contemplates the supporting and attaching of the motor in such relation to the branches that its continual high speed rotary vibratory trembling motion is imparted to all of the limbs of the tree, and this vibratory trembling motion when once imparted to and taken up by the limbs will be transmitted by them through all of the switches and twigs of them and to every bud and blossom of the tree, and this vibratory trembling motion starts the sap to circulating and invigorates the buds and blossoms and renders them immune to the blighting and killing effects of frost.

In Figure 1, I have illustrated one method of imparting a vibratory motion to fruit trees, and in Fig. 2 another method, and Fig. 3 is a side elevation of a vibratory rotary motion motor, said vibratory rotary motion being imparted to said motor by a fly wheel mounted eccentrically on its driving shaft, and showing means for clamping the motor to the limbs of a tree.

In Fig. 1 the form of application comprises simply the attachment of a vibratory motion electric motor among the limbs of fruit trees by any suitable means, two motors and trees being shown with their electric current circuit wires extending to and from them. In this arrangement the vibratory motion is imparted directly to the limbs the motor is attached to. In Fig. 2, however, the vibratory trembling motion is imparted by a vibratory motion motor secured to two or more branches or limbs of the tree, and flexible members, like ropes, wires, flexible bands, flexible shafts, or coiled springs or rods of any suitable material, are directly connected at one of their ends to the motor and are connected at their opposite end to the other limbs or branches of the tree the motor is not clamped or otherwise directly secured to. In this arrangement, the ropes, flexible bands, wires, flexible shafts, or coiled springs or rods are arranged taut enough to effect a slight pulling or pushing movement in one direction corresponding to one or the other of the motions of the motor, or in the case of rods or flexible shafts, in both directions.

In the drawing, the numeral 1 designates the vibratory motion motors, and 2 the circuit wires.

3 designates overhead supporting posts, and 4 the fruit trees.

5 designates a shaft of the motor, and 5ᴬ the fly wheel, which is mounted eccentrically on the shaft.

Fig. 3 designates an enlarged view of a motor mounted on foundation plates 7, which are provided with pivoted shoes 8, carrying U bolts 9, the shoes being arranged to swing or tilt to lie against and be secured to the limbs by the U bolts, and the motor is provided with a plurality of screw eyes 10, to which the limb connecting member may be attached.

I preferably use a motor that is light in weight and that has a large shaft and that will have a vibratory motion that will be imparted to the whole of the motor. The motor also should be inexpensive, and its vibratory motion could be imparted to it by a fly-wheel out of balance or eccentrically arranged upon the shaft. In Fig. 1 the motors are shown illustrated as secured to the main limb or branch of the tree, and in Fig. 2 the motors are illustrated as secured to two of the limbs by the U bolts, and connected to several of the other branches by ropes. The U bolts or any other means that is employed to fasten the motors to the limbs, should surround some flexible material, such as asbestos or a felt pipe-covering material, to avoid injuring the bark of the limbs of the tree, as shown at 11.

My invention provides a simple, easily applied, inexpensive method of preventing frosts that is adapted for the individual orchardist having a small orchard, or the largest individual orchards, or to entire fruit growing districts or sections of any State. In the latter case the entire apparatus throughout a district or section can be manipulated from a central station, especially installed, and operated by attendants whose duty it is to keep close watch on falling temperatures, and when a frost-danger temperature is approaching, the electric current can be turned into the entire system throughout an entire section of country in an instant, and the fruit would be rendered immune from the blighting and killing effects of the frost.

While I have illustrated and described a preferred arrangement of my system, I do not wish to be limited to it, as my invention contemplates any motor-operated means by which a vibratory motion can be imparted to fruit trees.

Having described my system of imparting a vibratory motion to fruit trees to render them immune from frost and freezes, what I claim as new and desire to secure by Letters Patent is:

1. A system for imparting a vibrating motion to fruit trees, comprising a vibratory motion electric motor, means including circuit wires operatively connected to said motor for supplying power and means for securing said motor in fruit trees in such a manner as to impart to the tree the vibratory motion of the motor.

2. A system for imparting a vibrating trembling motion to fruit trees, comprising a vibratory motion motor, means for connecting said motor to said fruit trees in such a manner that the vibratory motion generated by the motor is imparted to said fruit trees and a supply of power operatively connected to said motor.

In testimony whereof I affix my signature in presence of two witnesses.

HERMAN L. DARLING.

Witnesses:
G. SARGENT ELLIOTT,
ADELLA M. FOWLE.

Copies of this patent may be obtained for five cents each, by addressing the "Commissioner of Patents, Washington, D. C."